(No Model.)
J. JACOBSON.
MIRROR AND METHOD OF MAKING THE SAME.
No. 465,996. Patented Dec. 29, 1891.
Fig. 1,
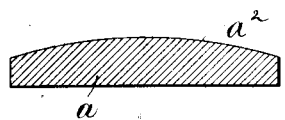
Fig. 2,
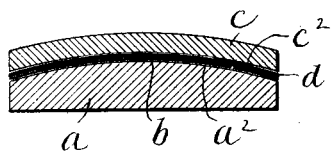
Fig. 3.
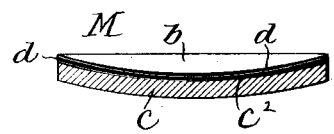
Witnesses
Jas. J. Maloney
N. E. Hill
Inventor;
John Jacobson,
by Jos. P. Livermore
Att'y

UNITED STATES PATENT OFFICE.

JOHN JACOBSON, OF BOSTON, MASSACHUSETTS, ASSIGNOR TO ELMER P. HOWE, OF SAME PLACE.

MIRROR AND METHOD OF MAKING THE SAME.

SPECIFICATION forming part of Letters Patent No. 465,996, dated December 29, 1891.

Application filed June 12, 1890. Serial No. 355,151. (No model.)

*To all whom it may concern:*

Be it known that I, JOHN JACOBSON, of Boston, county of Suffolk, State of Massachusetts, have invented an Improvement in Mirrors and Method of Making the Same, of which the following description, in connection with the accompanying drawings, is a specification, like letters on the drawings representing like parts.

My invention relates to a metallic-surfaced mirror or speculum and method of making the same, and is especially valuable in the production of concave mirrors for optical purposes. Such mirrors are commonly made by grinding the base that is to support the reflecting coating accurately to the shape required for the reflecting-surface (such base being usually composed of glass) and then coating the accurately-formed surface with metal and then polishing the surface of the metal. These operations require great skill and expenditure of time, thus making the cost of the mirror very great.

The present invention consists, partly, in a speculum or mirror comprising a base of glass or other sufficiently rigid material having a surface of substantially the shape required for the reflecting-surface, although it need not be accurately shaped or finished, and a thin metallic coating having the accurate shape required and having a polished surface, and a layer of cement interposed between said base and metallic coating, whereby the latter is securely connected with the former and receives the rigid support therefrom. In making a mirror of this kind in accordance with the method forming the subject of this invention a form is prepared the surface of which is accurately made the counterpart of the surface required for the mirror—that is, if it is required to form a concave parabolic mirror the form is ground accurately to present the curvature of the mirror on a convex surface. Such form is usually made of optical glass and prepared in the usual manner of preparing lenses or mirrors, the surface being shaped with the required degree of accuracy and highly polished. For convenience the process will be described as employed in making a concave mirror, although it is obvious that a plane, convex, cylindrical, or in fact any usual shape of reflecting-surface can be produced by the same method. The convex surface of the form is then coated with the metal that is to constitute the reflecting-surface, silver being the metal most commonly employed, and it being applied to the surface of the form in any of the ways employed for silvering glass. By this process a thin metal sheet is produced having a highly-polished and accurately-shaped surface in contact with the surface of the form; but such sheet of metal has no rigidity or strength other than what is derived from its contact with the form, and consequently it cannot without some further preparation be detached from the form, so that its surface that is now in contact with the form may be used as a reflector. In order to enable the metallic sheet to be removed from the form without bending or becoming distorted, a base-piece is connected with it while still on the form and retained in accurate shape thereby, and the form is then removed, leaving the accurately-shaped coating on the base. The base-piece may be of any suitable material, glass being preferred, said base having one surface shaped approximately to correspond with the shape desired for the reflecting-surface of the mirror. It is not necessary that the surface of the base should have the extreme accuracy required for the mirror, and consequently such surface may be prepared at very moderate expense either by grinding or by molding, or both. It is now necessary to transfer the perfectly-shaped metallic sheet to the approximately-shaped base, while retaining the perfect or true shape of the metallic sheet and connecting the said sheet with the base in such manner that the rigidity and strength of the latter will be added to the former, and thus give it sufficient support to retain the shape imparted to it by the form. In order to accomplish this result when a glass base is used, a plastic cement is interposed between the outer surface of the metal sheet and the inner surface of the base, which is then pressed toward the metal surface, so that the plastic material completely fills the space between the concave surface of the base and convex surface of the metal sheet while the latter is still supported on the form and retained in accurate shape thereby, the said cement thus filling or covering, as it were, any inaccuracies in the base and being molded, as it were, by the sheet of metal itself and the form which is then supporting said sheet to the accurate shape required for the surface of the mirror. A suitable material for thus uniting the base and the metal sheet and molding into the space between their surfaces, so as to afford an accurately-shaped supporting-surface for the metal on an approximately-shaped base, is gum-shellac, which may be heated to a proper degree of plasticity to flow sufficiently to conform itself to the convex and concave surfaces between which it is placed and to fill up or provide for any inaccuracies in the latter which produce slight differences in the thickness of the space inclosed between the two. After the cement hardens the base can be separated from the form, and owing to the cementing quality of the interposed plastic material the metal will adhere to the latter and strip off from the glass form to which it was first applied, although retaining exactly the shape of said form and also the high polish imparted to it by coating it upon the highly-polished surface of the form, which can then be used again for the production of any other mirror by the same process as just described and may be used to produce an indefinite number of mirrors. Thus instead of having to grind the base or rigid support of each mirror to accurate shape the operation that causes the greatest portion of the cost of the mirror a single form ground accurately to shape may be used to produce an indefinite number of mirrors, so that the cost of grinding the one form divided among all the mirrors produced therefrom is small for each mirror. Furthermore, by the herein-described process the operation of polishing the metal surface, which is also a large item in the cost of a metallic-surfaced mirror made in the usual way, is wholly obviated, the polish taken from contact with the surface of the form being equal to that attained by polishing the surface of the metal itself.

Figure 1 is a sectional view of a form such as may be employed for producing mirrors in accordance with this invention; Fig. 2, a similar section showing the form with the metal applied thereto and the base or rigid support for the metal surface of the mirror cemented to the said metal while on the form, and Fig. 3 a similar section of the complete mirror.

The form $a$ may be of any desired material, preferably glass such as used for lenses or mirrors, said form having its surface $a^2$ shaped as accurately as possible to the converse or counterpart of the surface required for the mirror. The said surface $a^2$ is then provided with a coating $b$ of metal, which may be applied thereto in any usual manner, and the base or rigid portion $c$ of the mirror, preferably made of glass, has its surface $c^2$ shaped approximately to that required for the surface of the mirror, it being shaped as accurately as can be without the great expense required for producing a true optical mirror. A plastic cementing material $d$ is interposed between the surface $c^2$ of the base $c$ and the outer surface of the metal $b$ while the latter still remains applied to the form $a$, as shown in Fig. 2, said base $c$ being pressed toward the metal supported on the form sufficiently to cause the cement to completely mold itself into the space between the approximately-shaped space $c^2$ of the base and the accurately-shaped surface of the metal $b$, so that as it adheres firmly to the base $c$ and becomes hard thereon it practically forms a part of the base and at the same time has the accurate surface required for the mirror.

Gum-shellac has been found to answer for uniting the metal with the base and affording an accurate surface for the metal supported on it, and when hardened it adheres to the metal sufficiently to take it off from the base when the form and base are forcibly separated, there being thus produced a mirror M, Fig. 3, having a highly-polished metallic surface of exactly the same shape as the surface of the form $a$ and a base composed of rigid material and hardened cement.

It is not essential to the method that cement should be used for connecting the metal sheet with a supporting-base, as the metal sheet might be connected with a support and removed from the form in other ways. For example, a much thicker coating of a baser metal might be applied to the metal that is to afford the reflecting-surface of the mirror while on the form, and said baser metal might be supplied of a sufficient thickness to afford the necessary rigidity and constitute the base of the mirror, or it might have other materials connected with it, the essential feature of the method forming the subject of this invention being that the metal that is to afford the reflecting-surface is applied to a form suitably shaped to give the surface of the metal in contact with the form the required shape for the reflector and connecting the said metal coating or sheet while still on the form with a sufficiently-rigid base or support to sustain the metal coating and to enable it to be removed from the form, while preserving the exact shape and quality of surface which it received from contact with the form.

The plan of connecting the metal coating with the base by means of a plastic cement, as herein described, is believed to be the best and is in practice found to be efficient.

I claim—

1. As an improved article of manufacture, the within-described mirror composed of a deposited reflecting-surface, a base of rigid material, and a cementitious connecting medium applied between the base and the back of the reflecting-surface, substantially as set forth.

2. That improvement in the art of making metallic mirrors which consists in depositing upon a bright and perfectly-finished mold a film of metal in solution, whose reflecting-face, which is next the mold, will be completed and finished without polishing or other manipulation simply by deposition upon such mold, then applying a rigid backing to such film, and finally stripping from the mold, substantially as described.

In testimony whereof I have signed my name to this specification in the presence of two subscribing witnesses.

JOHN JACOBSON.

Witnesses:
  JOS. P. LIVERMORE,
  M. E. HILL.